United States Patent
Neubauer et al.

(10) Patent No.: US 12,374,708 B2
(45) Date of Patent: Jul. 29, 2025

(54) PROTECTIVE REFORMER DEVICE FOR THE PROTECTION OF AN ANODE SECTION OF A FUEL CELL STACK

(71) Applicant: AVL List GmbH, Graz (AT)

(72) Inventors: Raphael Neubauer, Graz (AT); Thomas Strasser-Krauss, Graz (AT)

(73) Assignee: AVL List GmbH, Graz (AT)

( * ) Notice: Subject to any disclaimer, the term of this patent is extended or adjusted under 35 U.S.C. 154(b) by 435 days.

(21) Appl. No.: 17/792,743

(22) PCT Filed: Feb. 5, 2021

(86) PCT No.: PCT/AT2021/060044
§ 371 (c)(1),
(2) Date: Jul. 14, 2022

(87) PCT Pub. No.: WO2021/155417
PCT Pub. Date: Aug. 12, 2021

(65) Prior Publication Data
US 2023/0037576 A1 Feb. 9, 2023

(30) Foreign Application Priority Data
Feb. 6, 2020 (AT) .............................. A 50092/2020

(51) Int. Cl.
*H01M 8/0662* (2016.01)
*H01M 8/04014* (2016.01)
(Continued)

(52) U.S. Cl.
CPC ..... *H01M 8/0662* (2013.01); *H01M 8/04014* (2013.01); *H01M 8/04268* (2013.01);
(Continued)

(58) Field of Classification Search
CPC ......... H01M 8/04014; H01M 8/04268; H01M 8/04302; H01M 8/04328; H01M 8/04373;
(Continued)

(56) References Cited

U.S. PATENT DOCUMENTS

| 2009/0197131 A1 | 8/2009 | Sugiura |
| 2011/0146154 A1 | 6/2011 | Modarresi |

(Continued)

FOREIGN PATENT DOCUMENTS

| DE | 102016218800 | 3/2018 |
| DE | 102017200995 | 6/2018 |

(Continued)

OTHER PUBLICATIONS

International Search Report and the Written Opinion Dated May 17, 2021 From the International Searching Authority Re. Application No. PCT/AT2021/060044 and Its Translation of Search Report Into English. (13 Pages).

(Continued)

*Primary Examiner* — Victoria H Lynch (57) ABSTRACT

The present invention relates to a protective reformer device (10) for the protection of an anode section (112) of a fuel cell stack (110) against oxidizing damage during a heating-up process, having a gas duct (20) with a gas inlet (22) and a gas outlet (24) for conducting fuel gas from an anode feed section (120) of the fuel cell stack (110), wherein a catalytic converter section (30) is arranged in the gas duct (20) for a catalytic oxidation of at least part of the fuel gas into a protective gas for feeding to the anode section (112), wherein, furthermore, the gas duct (20) has a temperature control device (40) in thermally transmitting contact with the catalytic converter section (30) for an active temperature control of the catalytic converter section (30).

13 Claims, 6 Drawing Sheets

(51) Int. Cl.
*H01M 8/04223* (2016.01)
*H01M 8/04302* (2016.01)
*H01M 8/0432* (2016.01)
*H01M 8/04701* (2016.01)
*H01M 8/0612* (2016.01)

(52) U.S. Cl.
CPC ... *H01M 8/04302* (2016.02); *H01M 8/04328* (2013.01); *H01M 8/04373* (2013.01); *H01M 8/04738* (2013.01); *H01M 8/0618* (2013.01)

(58) Field of Classification Search
CPC ........... H01M 8/04738; H01M 8/0618; H01M 8/0662; Y02E 60/50
See application file for complete search history.

(56) References Cited

U.S. PATENT DOCUMENTS

2017/0110749 A1* 4/2017 Waller ................. H01M 8/103
2019/0245226 A1 8/2019 Scotto et al.

FOREIGN PATENT DOCUMENTS

EP         2726188        12/2017
WO    WO 2019/178628      9/2019

OTHER PUBLICATIONS

Birmingham et al., "Development of An External Fuel Processor for A Solid Oxide Fuel Cell", Rolls-Royce Fuel Cell Systems Inc., USA, Final Report, Report Period: Mar. 2006-May 2008, DOE Award No. DE-FC26-06NT42809, p. 1-25, Jun. 5, 2008. (29 Pages).

* cited by examiner

PROTECTIVE REFORMER DEVICE FOR THE PROTECTION OF AN ANODE SECTION OF A FUEL CELL STACK

RELATED APPLICATIONS

This application is a National Phase of PCT Patent Application No. PCT/AT2021/060044 having International filing date of Feb. 5, 2021, which claims the benefit of priority of Austria Patent Application No. A50092/2020 filed on Feb. 6, 2020. The contents of the above applications are all incorporated by reference as if fully set forth herein in their entirety.

FIELD AND BACKGROUND OF THE INVENTION

The present invention relates to a protective reformer device for the protection of an anode section of a fuel cell stack, a fuel cell system having such a protective reformer device and a method for the protection of an anode section of a fuel cell stack.

It is known that, in fuel cells, the anode sections need to be protected in certain operating situations. This is in particular the case during the heating-up process of the fuel cell stack. For example, as from a critical limit temperature of for example around 400° Celsius in the anode section, it can happen that an undesired oxidation could lead to damage to or even to the delamination of catalytic layers in the anode section. In order to avoid this undesirable oxidising damage, it is known for the anode section to be flushed with a protective gas from an external gas supply during the heating-up process. It is also known for an electrical voltage to be applied to the anode section during the heating-up process in order to protect the anode section from oxidation by electrical means.

A disadvantage of the known solutions is that these are associated with a high degree of complexity. For example, the provision of a separate protective gas supply for the heating-up process requires additional components and additional fluid lines. In addition to the installation space required, this also leads to significant disadvantages in terms of increased weight, especially in a mobile application of the fuel cell stack. If an electrical protection of the anode is desired, this means that the additional electrical load needs to be applied at a time during the heating-up process at which further electrical loads are already applied to the system. Thus, the electrical load is additionally increased by this protective function.

SUMMARY OF THE INVENTION

It is the object of the present invention to remedy, at least partially, the disadvantages described above. In particular, it is the object of the present invention to ensure, in a cost-effective and simple way, the protection of an anode section of a fuel cell stack against oxidising damage during a heating-up process.

The above object is achieved by a protective reformer device with the features of claim 1, a fuel cell system with the features of claim 10 and a method with the features of claim 13. Further features and details of the invention emerge from the dependent claims, the description and the drawings. Naturally, features and details which are described in connection with the protective reformer device according to the invention also apply in connection with the fuel cell system according to the invention as well as the method according to the invention and vice versa, so that with regard to disclosure, mutual reference is or can always made to the individual aspects of the invention.

According to the invention, a protective reformer device is designed for the protection of an anode section of a fuel cell stack against oxidising damage during a heating-up process. For this purpose, the protective reformer device has a gas duct with a gas inlet and a gas outlet for conducting fuel gas from an anode feed section of the fuel cell stack. A catalytic converter section is arranged in the gas duct for a catalytic oxidation of at least part of the fuel gas into a protective gas for feeding to the anode section. Furthermore, the gas duct is equipped with a temperature control device which is in thermally transmitting contact with the catalytic converter section for an active temperature control of the catalytic converter section.

A protective reformer device according to the invention can also be referred to, in the sense of the present invention, as an additional reformer device or microreformer device. Such a protective reformer device thus serves, substantially exclusively, the purpose of production of the protective gas and not the preparation of the fuel gas for the normal operational use of the fuel gas after the fuel cell stack. According to the invention, the protective gas can be produced directly within the fuel cell system during the heating-up process. This no longer requires a separate connection to a protective gas source. The functionality of this protective gas production is explained in more detail below.

During the heating-up process of the fuel cell stack, the fuel cell stack and in particular the anode section will reach a critical temperature of for example around 400° Celsius at a certain point during heating-up. As soon as this has happened there is a risk of oxidative damage to the anode section. In order to avoid this, a reducing atmosphere must be created in the anode section by this time at the latest. According to the invention, this is made possible by the protective reformer device. For this purpose, this must be placed in a reforming state, i.e. a state in which the catalytic oxidation can be carried out. Usually, catalytic converter sections are designed for the oxidation of fuel gas or combustible gas with operating temperatures of between around 200° Celsius and around 600° Celsius. Within this operating corridor it is possible to convert fuel gas into a protective gas using the catalytic converter. This conversion can be effected both stoichiometrically and unstoichiometrically. According to the invention, in order to ensure that, during the heating-up process, on reaching the critical temperature in the anode section this is flushed with a corresponding protective gas, the production of protective gas within the fuel cell system can be carried out in an active manner.

Thus, at a point in time during the heating-up process, especially before reaching the critical temperature in the anode section, it is ensured that a sufficient operating temperature for the catalytic oxidation of the fuel gas into a protective gas prevails in the catalytic converter section. With the help of the temperature control device, both heating and cooling can take place in order to keep the catalytic converter section within the desired operating corridor. However, during the heating-up process, in particular in a first step, a heating-up is required in order to bring the catalytic converter section to an operating temperature of, for example, around 200° Celsius in good time. Fuel gas, which is fundamentally available within the fuel cell stack from a corresponding fuel gas source, can now be introduced into the gas duct via the gas inlet, as this is in particular part of the anode feed section. The introduced fuel gas is now at least partially catalytically oxidised by the catalytic converter section which has been brought to operating temperature by means of the temperature control device, so that a protective gas is produced from the fuel gas. According to the invention such a protective gas has in particular the components hydrogen and carbon monoxide. The protective gas produced in this way is now fed out of the gas outlet, through the anode feed section, to the anode section, so that a reducing protective gas atmosphere has been produced there at the latest when the critical temperature of around 400° Celsius is reached.

As can be seen from the above explanation, a separate gas supply with protective gas is no longer necessary, since the protective gas can be produced integrally within the fuel cell system by the protective reformer device. It is often necessary to apply a voltage to protect the fuel cell stack. This places an additional load on the entire fuel cell system. This disadvantage is overcome or at least reduced through the use of protective gas. Thus, a simple and cost-effective protection option is provided in order to protect the anode section of the fuel cell stack against oxidising damage during the heating-up process.

In principle, it is immaterial whether the protective reformer device is located directly in the anode feed section or in a bypass of the anode feed section. It can also clearly be seen here that the protective reformer device is an additional reformer in addition to the normal preparatory reformer for the fuel gas. This means that the protective reformer device and in particular the catalytic converter section can be made significantly smaller, since to achieve the protective effect the protective gas does not have to flow continuously through the anode section; rather, this substantially only needs to be filled once to form the reducing atmosphere with the protective effect. Thus, it is sufficient if, during the heating-up process, the fuel gas flows over the catalytic converter section once, at low flow velocities and low volume throughput, in order to achieve the conversion, and the protective and reducing atmosphere in the anode section is created in this way. In the normal operation of the fuel cell stack, significantly higher volume flows are involved, so that the catalytic converter section has no effect, or substantially no effect, with high volume flows and a correspondingly shorter dwell time of the fuel gas in the catalytic converter section. Thus, the protective reformer device has no effect or substantially no effect on normal operation, so that it can be made correspondingly small and compact in terms of the exclusively protective functionality.

According to the invention it is possible to provide an integral production of protective gas with a particularly small microreformer in the form of the protective reformer device, which due to the active temperature control can be used for anode protection even with narrow operating windows. In this way, separate gas supplies or electrical protective measures can be completely or substantially completely avoided.

A wide variety of catalytic oxidation reactions can be carried out during the conversion in the catalytic converter section. For example, a so-called steam reforming (SR) is basically conceivable. A partial catalytic oxidation (CPDX) can also be used. Naturally, a complete or substantially complete oxidising conversion of fuel gas in the protective gas is also possible.

It is further advantageous if, in a protective device according to the invention, the temperature control device is designed as a heating device, as a cooling device or as a combined heating and cooling device. In particular, a heating functionality is advantageously integrated in the temperature control device. This is particularly advantageous in a heating-up process if it is to be ensured that, in order to achieve a critical anode temperature, the catalytic converter section is already within its operating window and in this way can produce the protective gas, or the protective gas has already been produced. However, during the further heating-up process a cooling functionality may also be necessary or advantageous in order to avoid damage to the catalytic converter section during the heating-up phase. In particular, to allow maximum flexibility in the use of the protective reformer device the temperature control device is designed both as a heating and cooling device. The heat source or the cooling source can be freely selected depending on the area of application and can in particular be connected to existing heat sources or existing cooling sources within the fuel cell system.

It can bring further advantages if, in a protective reformer device according to the invention, the temperature control device is designed, at least partially, as an independent temperature control device independent of fluid flows of the fuel cell stack. For example, a separate heating medium circuit or a separate cooling circuit can supply this temperature control device with cold or heat. An electrically operated heating system is also fundamentally conceivable here as a temperature control device. Naturally, such separate temperature control devices can also be combined with heat exchangers, as will be explained below. A separately designed temperature control device allows increased flexibility in the control of the temperature control device, so that in particular the temperature control can be carried out without being influenced by or dependent on the rest of the fuel cell system.

It can bring further advantages if, in a protective reformer device according to the invention, the temperature control device is designed, at least partially, as a heat exchanger, wherein the gas duct forms a first heat exchanger side of the heat exchanger. Such a heat exchanger design makes it possible for a temperature control to be provided both separately, as explained in the previous paragraph, as well as in combination with fluid flows of the fuel cell system, as explained below. The first heat exchanger side can be designed as a cold heat exchanger side if the temperature control device is configured for heating-up. If a cooling situation is desired, the first heat exchanger side can also be defined as a hot heat exchanger side, wherein, accordingly, the second opposite heat exchanger side, as the cold side, provides the cooling function. In particular, the second heat exchanger side is combined with fluid flows within the fuel cell system, as explained in more detail below. A switchability between cooling function and heating function is also fundamentally possible within the framework of the present invention, for example by switching corresponding valves in the supply to the second heat exchanger side of the heat exchanger.

Furthermore, it is advantageous if, in a protective device according to the invention, the second heat exchanger side of the heat exchange is formed, at least partially, by a cathode feed section of the fuel cell stack. A cathode feed section is in particular the supply of air or oxygen to provide the corresponding reactants in the cathode section. In particular when using a cooling functionality of the temperature control device, outdoor air or supplied oxygen can form this cooling source. Here again, it should be pointed out that different fluid flows on the second heat exchanger side can naturally be supplied separately in qualitative terms or combined in quantitative terms via valves.

It can bring further advantages if, in a protective reformer device according to the invention, the second heat exchanger side of the heat exchanger is formed, at least partially, by a cathode discharge section of the fuel cell stack. Here, the exhaust gas from the cathode side is fed back to the second heat exchanger side via the cathode discharge section. In particular during the heating-up process, a heating-up and thus a heat source on the second heat exchanger side can be ensured in this way. Heated exhaust gas from the cathode section can release its heat via the heat exchanger to the first heat exchanger side and from there to the fuel gas or the cathode section. This can be installed directly downstream of the cathode section, but also for example downstream of an upstream normal heat exchanger of the normal operating reformer.

In addition, it is advantageous if, in a protective reformer device according to the invention, the second heat exchanger side of the heat exchanger is formed, at least partially, by an anode discharge section of the fuel cell stack. In a similar manner to the previous paragraph, anode exhaust gas can also be introduced into the second heat exchanger side via the anode discharge section, and the corresponding residual heat can be used to heat up the catalytic converter section. Upstream post-treatments of the anode exhaust gas, for example an oxidation catalyst or further heat exchangers for preparing the heat, are also conceivable here. Here again, it should be pointed out that valve devices can naturally be used to feed the individual fluid flows of the fuel cell stack to the second heat exchanger side of the heat exchanger depending on the desired heating or cooling requirements.

It is also advantageous if, in a protective reformer device according to the invention, at least one valve device is provided upstream of the second heat exchanger side of the heat exchanger for a variation of the fluid fed to the second heat exchanger side. In particular, the variants described in the preceding paragraphs can be combined. For example, it is conceivable that a multi-pass valve is installed upstream of the second heat exchanger side and both the anode discharge section and the cathode discharge section as well as the cathode feed section are fed to this valve device. Via a purely qualitative valve of the valve device, a switching between these gas flows can take place and the temperature control of the protective reformer device and thus of the catalytic converter section can thus be controlled or regulated on the basis of the heat or coldness of the respective gas flow. In addition to a pure qualitative switching, a quantitative switching can also fundamentally take place in the valve device in order to vary the mixing ratios of the supplied fluids and in this way ensure resulting mixing temperatures on the second heat exchanger side to allow an even more detailed and precise control of the temperature of the catalytic converter section. In particular, such a valve device is also equipped with corresponding temperature sensors for the supplied and the mixed fluids as well as with flow measuring elements.

It is also advantageous if, in a protective reformer device according to the invention, the gas duct and/or the catalytic converter section are at least partially manufactured using an additive process. This is for example a so-called 3D printing process which uses metal materials in particular. By using multiple components in the printing process, it is possible to print the catalytic converter section together with the gas duct and thus to produce it using an additive process. This makes it possible to provide the protective reformer device, even with very small dimensions, by using the metallic materials. In other words, this makes it possible to make the protective reformer device even smaller, even more compact and cost-effective.

The subject matter of the present invention also includes a fuel cell system having:
- at least one fuel cell stack with an anode section and a cathode section,
- an anode feed section for feeding reformed anode feed gas from a reformer to the anode section,
- a cathode feed section for feeding cathode feed gas to the cathode section,
- a reformer for reforming reformer feed gas,
- a reformer feed section for feeding the reformer feed gas to the reformer,
- an anode discharge section for discharging anode exhaust gas,
- a cathode discharge section for discharging cathode exhaust gas.

Also, a protective reformer device according to the present invention is arranged in the anode feed section between the reformer and the anode section. Thus, a fuel cell system according to the invention brings the same advantages as have been explained in detail in relation to a protective reformer device according to the invention. The protective reformer device can be introduced into the anode feed section both in a direct way and in an indirect way, as will be explained in more detail later.

According to the invention it is advantageous if, in a fuel cell system according to the invention, the anode feed section has a main anode feed section and a bypass anode feed section. The protective reformer device is arranged in the bypass anode feed section. In other words, if the bypass anode feed section is switched off via valve devices, the protective reformer device can also be switched off in that this is decoupled in a fluid-tight manner from the main anode feed section. This makes it possible for the protective reformer device only to be activated through corresponding valve switching during heating-up operation. In normal operation, no fuel gas flows through the bypass anode feed section and thus also does not flow through the protective reformer device.

It can also be advantageous if, in a fuel cell system according to the invention, a starting burner device is arranged in the cathode feed section, in the cathode discharge section and/or in the anode discharge section. This makes it possible to support the heating-up phase and actively heat up the respective fluid flow. Such a starting burner device can provide the desired heat source, at least partially, both in an electrical manner and in a corresponding exothermic conversion of the gas carried therein. In particular, a heat supply can be switched on and off in this way.

The subject matter of the present invention also includes a method for the protection of an anode section of a fuel cell stack of a fuel cell system according to the invention, having the following steps:
- monitoring an anode temperature in the anode section,
- monitoring a protective reformer temperature of the protective reformer device,
- cooling and/or heating the protective reformer device on the basis of the monitored temperature by means of the temperature control device.

A method according to the invention bring the same advantages as have been explained in detail in relation to a fuel cell system according to the invention and in relation to a protective reformer device according to the invention. In particular, the time from which the protective gas atmosphere in the anode section should be made available can be flexibly selected in this way. As has already been explained, this can be useful even before reaching a critical temperature in the anode section, so that a targeted temperature management in the protective reformer device provides this, in a desired manner, with the protective gas atmosphere. This targeted controllability makes it possible to make the protective reformer device significantly smaller than is the case with a normal operating reformer device.

It can also be advantageous if, in a method according to the invention, the step of cooling and/or heating is carried out on the basis of a specified operating corridor of the protective reformer device. This operating corridor is a temperature corridor for the protective reformer device and lies, for example, between around 200° Celsius and around 600° Celsius. In this way, the reformer functionality of the catalytic converter section is ensured and at the same time damage to the reformer and/or the fuel cell stack due to excessively high temperatures is avoided.

It is also advantageous if, in a method according to the invention, the step of cooling and/or heating is carried out on the basis of a minimum anode temperature and/or of a maximum temperature difference with respect to a cathode temperature of the cathode section of the fuel cell stack. This can be carried out alternatively or in addition to the control functionality described in the previous paragraph. This means that further temperatures or sensor parameters can naturally be used to carry out a method according to the invention with greater flexibility and higher control precision.

BRIEF DESCRIPTION OF THE SEVERAL VIEWS OF THE DRAWINGS

Further advantages, features and details of the invention emerge from the following description, in which exemplary embodiments of the invention are described in detail with reference to the drawings. The features mentioned in the claims and in the description can each be essential to the invention, taken individually or in any combination. In each case schematically:

DESCRIPTION OF SPECIFIC EMBODIMENTS OF THE INVENTION

Figures 1, 2:
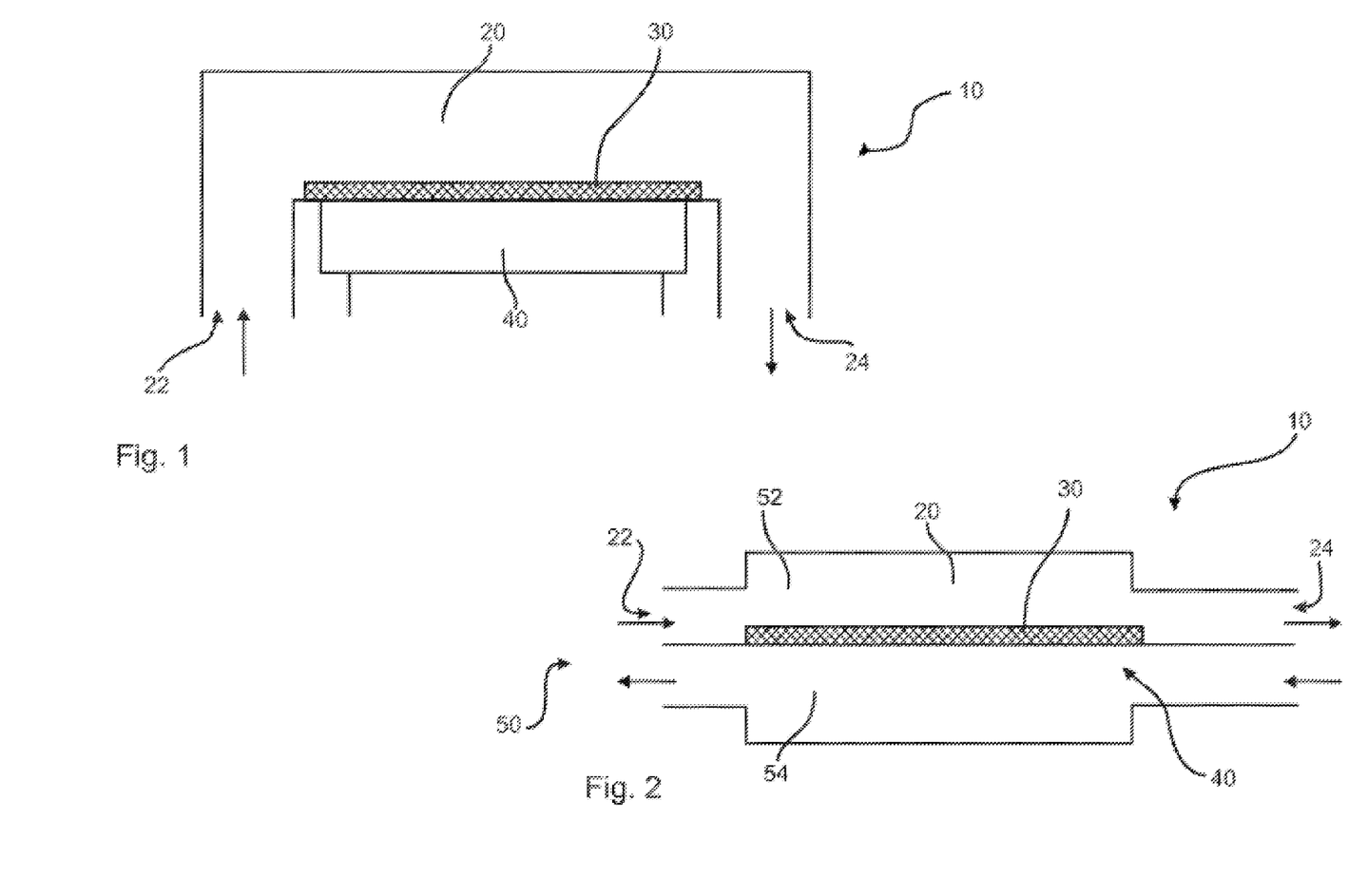
FIG. 1 shows an embodiment of a protective reformer device according to the invention.
FIG. 2 shows a further embodiment of a protective reformer device according to the invention.

An embodiment of a protective reformer device 10 according to the invention is represented schematically in FIG. 1. This is equipped with a gas duct 20 via which fuel gas can be supplied via a gas inlet 22 and the fuel gas or the generated protective gas can be discharged again via the gas outlet 24. During a heating-up process of the fuel cell system 100, fuel gas is fed to the gas duct 20 via the gas inlet 22. The temperature of the catalytic converter section 30 can be set via the temperature control device 40.

In particular, this is achieved by heating and/or cooling of the catalytic converter section 30. The embodiment shown in FIG. 1 is a separate temperature control device 40 which has for example a separate coolant or also an electrical heating or a separate heating medium. In this way, the defined temperature control thermally activates the catalytic converter section 30 and at the same time protects this from undesirable damage, so that an activated catalytic converter section 30 can convert the fuel gas flowing through the gas duct 20 into a protective gas in a catalytically oxidising manner. The produced protective gas is now fed to the anode section 112 via the gas outlet 24, so that a reducing atmosphere can be created there to protect the anode section 112.

FIG. 2 is based on a similar core concept for the production of protective gas in the gas duct 20. However, here the temperature control device 40 of the protective reformer device 10 is designed as a heat exchanger 50. The gas duct 20 with the gas inlet 22 and gas outlet 24 therefore forms the first heat exchanger side 52. A second heat exchanger side 54 permits heat-transmitting contact via a wall, in particular directly with the catalytic converter section 30, so that fluid flowing through the second heat exchanger side 54 can provide a heat transfer with the catalytic converter section 30. With cold fluid on the second heat exchanger side 54, a cooling of the catalytic converter section 30 thus takes place and, correspondingly, with hot fluid a heating of the catalytic converter section 30 takes place. Otherwise, the embodiment shown in FIG. 2 can be integrated into the heating-up process in the same way as explained with reference to FIG. 1.

Figure 3:
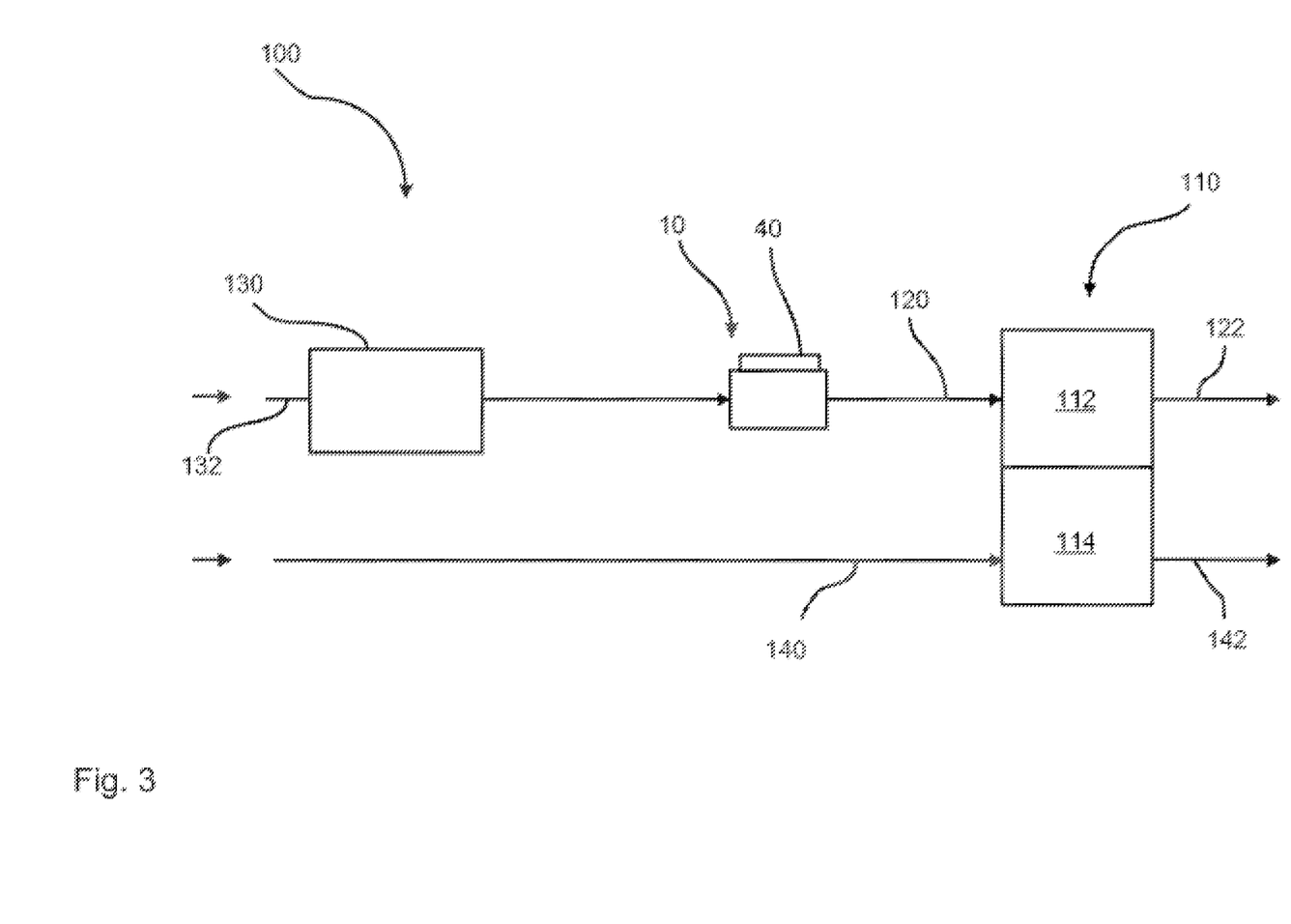
FIG. 3 shows an embodiment of a fuel cell system according to the invention.

FIG. 3 shows, schematically, the simplest embodiment of a fuel cell system 100 according to the invention. Here, the fuel cell stack 110 is shown with an anode section 112 and a cathode section 114. Fuel gas can be fed via a reformer feed section 132 to a reformer 130 in which, in normal operation, the fuel gas is used or converted for use in the fuel cell stack 110, specifically in the anode section 112. For the heating-up process, the protective reformer device 10 according to the invention is arranged between the reformer 130 and the anode section 112. With the help of a for example electrically-acting temperature control device 40, in this case formed separately, an active heating or also an active cooling or a combination of heating and cooling can be provided for the inflowing fuel gas, so that the catalytic converter section in the protective reformer device 10 can be activated accordingly in order to ensure a reducing protective gas atmosphere during the heating-up process in the anode section 112.

Corresponding exhaust gas from the anode section 112 is discharged via the anode discharge section 122. In this simple embodiment, the cathode side of the cathode section 114 is completely separated from the protective reformer device 10 according to the invention.

Figure 4:
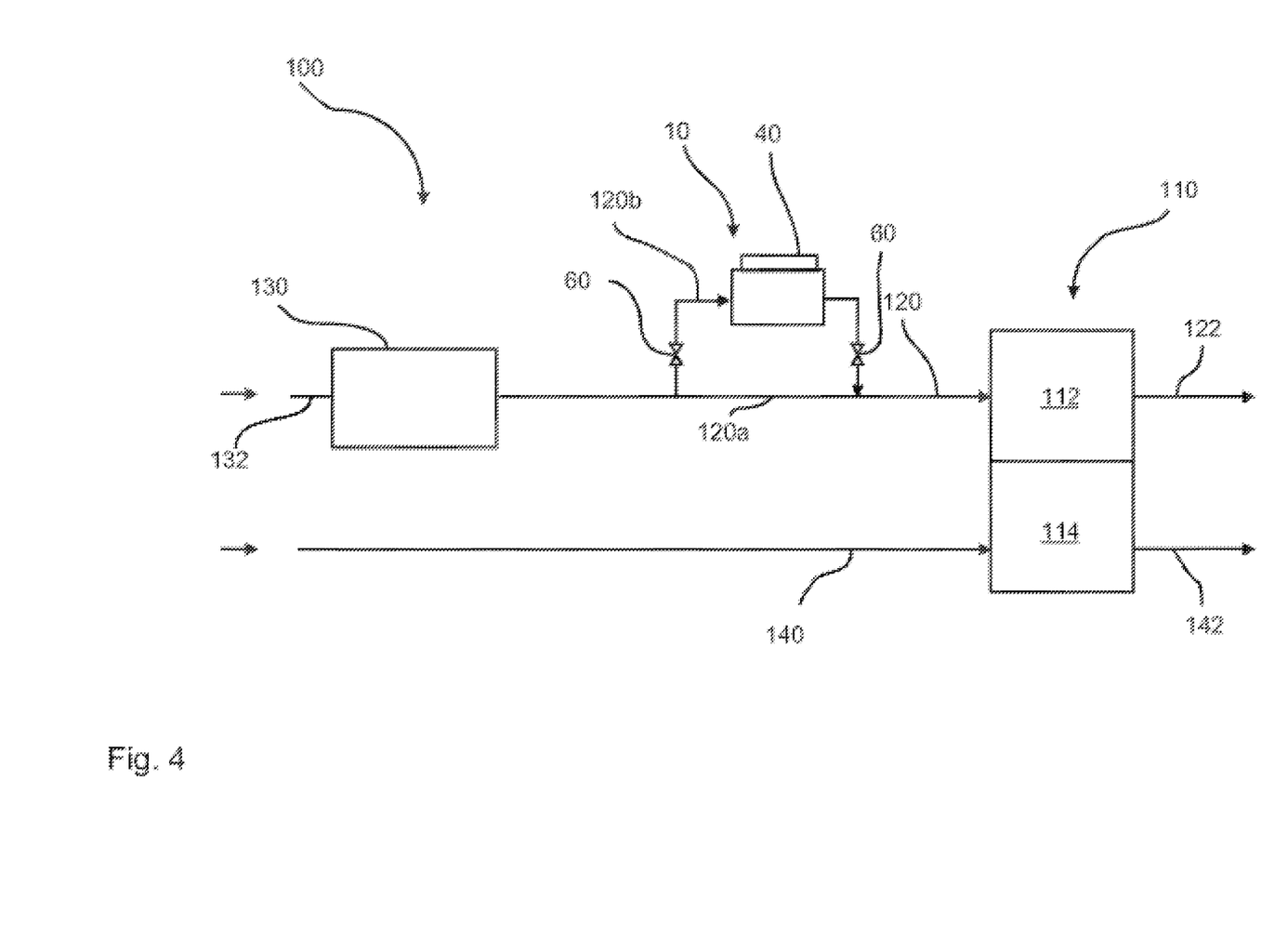
FIG. 4 shows a further embodiment of a fuel cell system according to the invention.

FIG. 4 shows a further development in which the anode feed section 120 is divided into a main anode feed section 120a and a bypass anode feed section 120b. In this way, during the heating-up process the protective reformer device 10 can, via appropriate valve devices 60, be integrated into the inflow to the anode section 112 and deactivated in the normal operating state. In other words, this makes possible an increased controllability of the flow through the protective reformer device 10.

Figure 5:
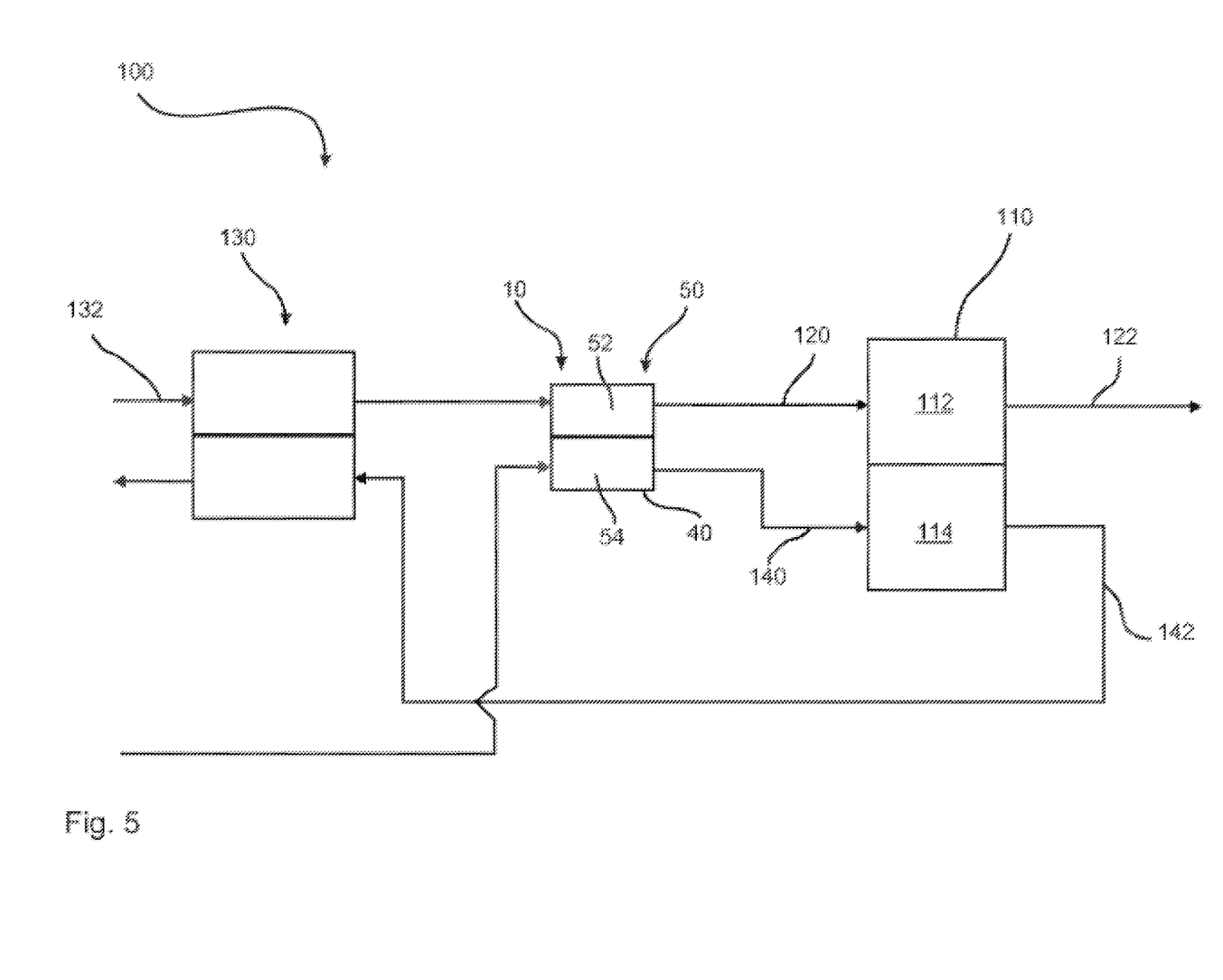
FIG. 5 shows a further embodiment of a fuel cell system according to the invention.

FIG. 5 shows a different embodiment and a further integration of the protective reformer device 10. Here, the temperature control device 40 is designed as a heat exchanger 50, so that a heating or cooling and thus a temperature control through fluid flows within the fuel cell system 100 is made possible. In the variant shown in FIG. 5, for this purpose supply air, as cathode feed gas, is introduced into the heat exchanger 50 directly via the second heat exchanger side 54 and then fed to the cathode section 114 via the cathode feed section 140. If cold air is sucked in, a cooling function can be provided in this way. However, other heat exchangers or start burners can naturally also be used to heat up the supply air sucked in from the outside, and thus the cathode feed gas, before reaching the second heat exchanger side 54, so that, alternatively, a heating function can also be provided here.

Figure 6:
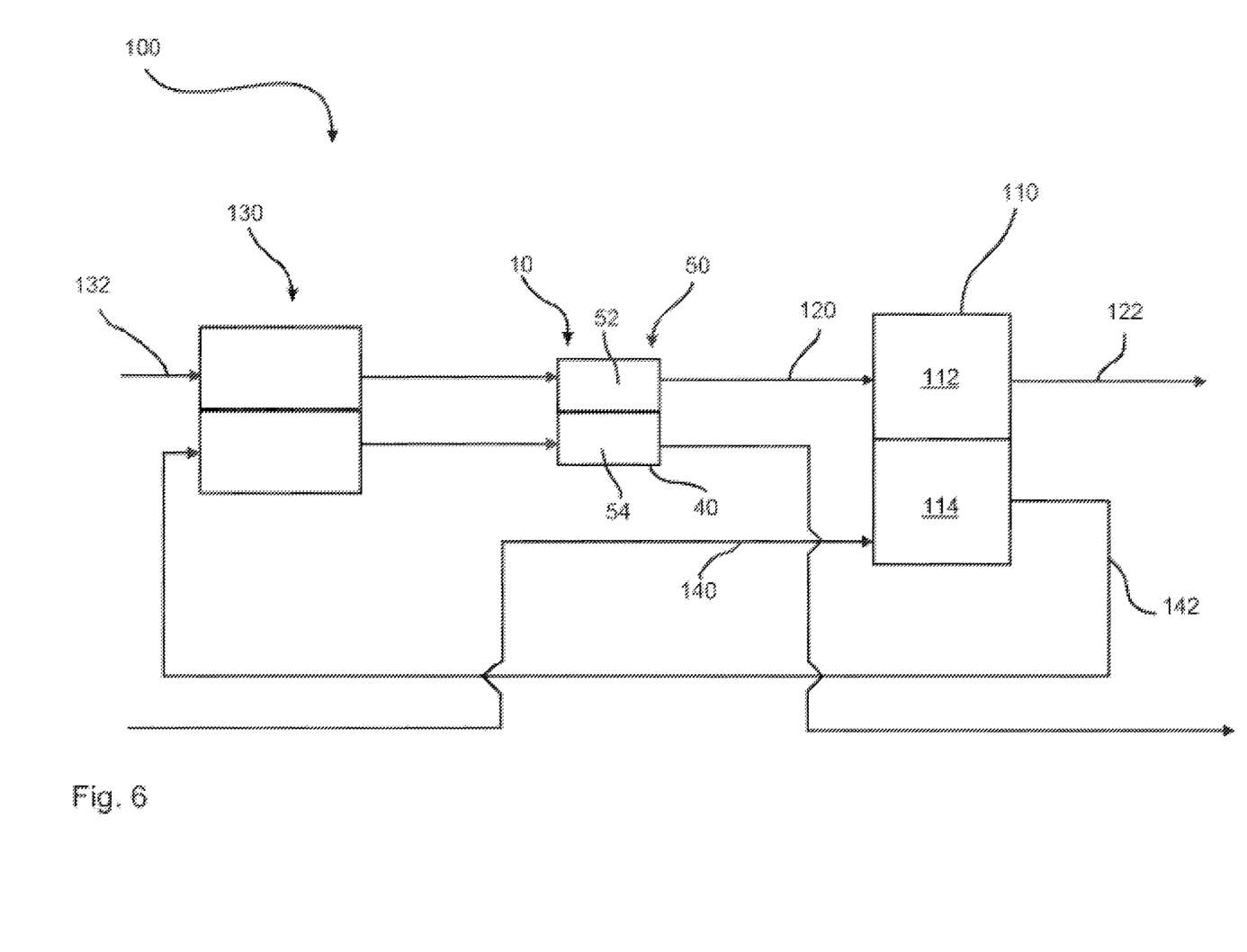
FIG. 6 shows a further embodiment of a fuel cell system according to the invention.

In the embodiment shown in FIG. 6, cathode exhaust gas which is discharged from the cathode section 114 via the cathode discharge section 142 is used instead of the cathode feed gas. In the embodiment shown in FIG. 6, this cathode exhaust gas first flows through the normal reformer 130 on its other heat exchanger side and then through the second heat exchanger side 54 of the protective reformer device 10. This represents in particular a heating option for the catalytic converter section 30.

Figure 7:
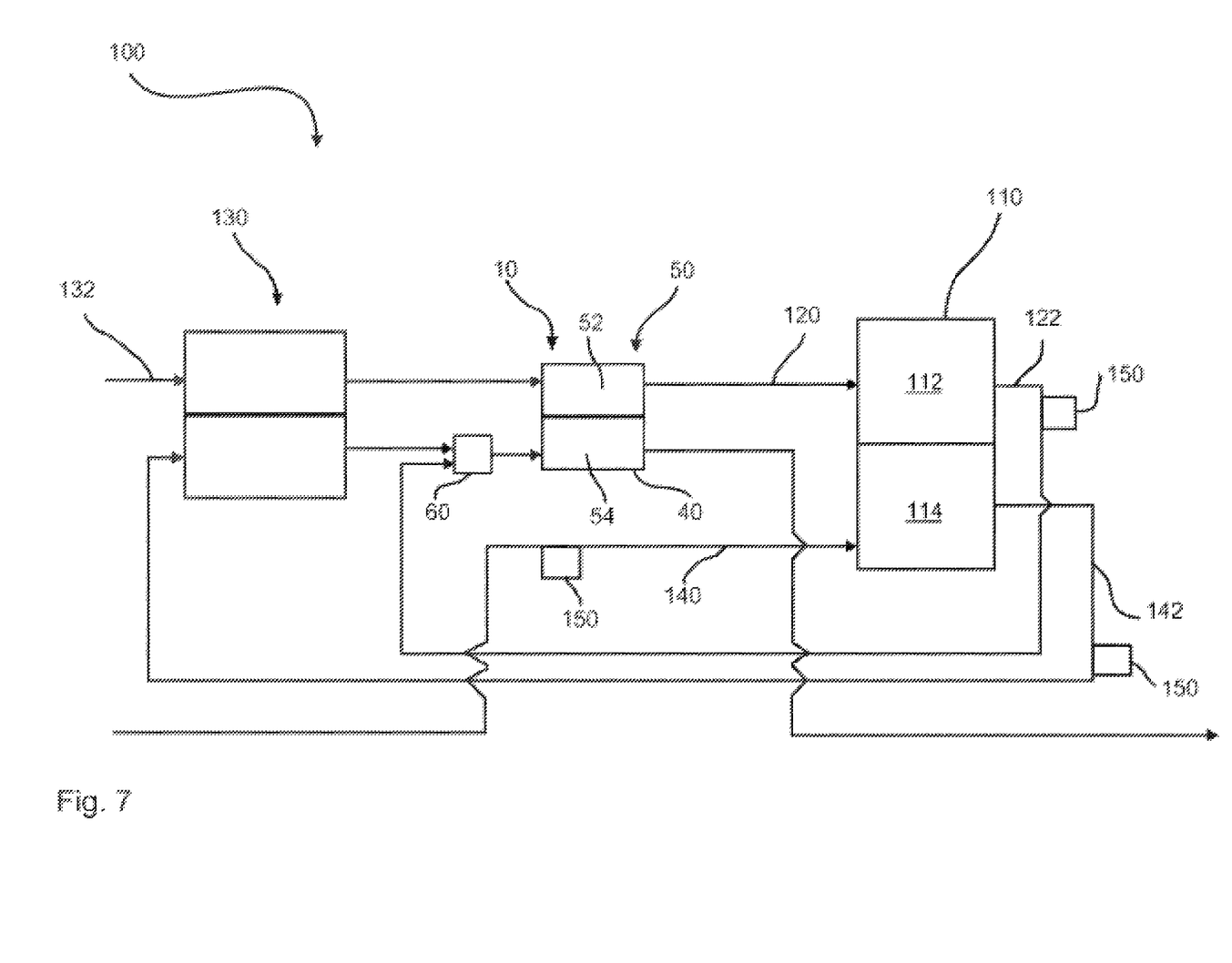
FIG. 7 shows a further embodiment of a fuel cell system according to the invention.

FIG. 7 shows an extended embodiment which in particular allows a switchability of the temperature control device 40 as a heat exchanger 50. Here, cathode exhaust gas from the cathode discharge section 142 and anode exhaust gas from the anode discharge section 122 are brought together in a valve device 60. This can involve both a qualitative and a quantitative switching. In addition, it can be seen from FIG. 7 that starting burner devices 150 are provided at different points in order to have additional influence on the temperature and the heating-up process of the fuel cell stack 110.

The above explanation of the embodiments describes the present invention exclusively in the context of examples. Naturally, individual features of the embodiments can, insofar as technically expedient, be freely combined with each other without departing from the scope the present invention.

LIST OF REFERENCE SIGNS 10 protective reformer device
20 gas duct
22 gas inlet
24 gas outlet
30 catalytic converter section
40 temperature control device
50 heat exchanger
52 first heat exchanger side
54 second heat exchanger side
60 valve device
100 fuel cell system
110 fuel cell stack
112 anode section
114 cathode section
120 anode feed section
120a main anode feed section
120b bypass anode feed section
122 anode discharge section
130 reformer
132 reformer feed section
140 cathode feed section
142 cathode discharge section
150 starting burner device

The invention claimed is:

1. A protective reformer device for the protection of an anode section of a fuel cell stack against oxidising damage during a heating-up process, having a gas duct with a gas inlet and a gas outlet for conducting fuel gas from an anode feed section of the fuel cell stack, wherein a catalytic converter section is arranged in the gas duct for a catalytic oxidation of at least part of the fuel gas into a protective gas for feeding to the anode section, wherein, furthermore, the gas duct has a temperature control device in thermally transmitting contact with the catalytic converter section for an active temperature control of the catalytic converter section;
wherein the temperature control device is designed at least partially as a heat exchanger, wherein the gas duct forms a first heat exchanger side of the heat exchanger;
wherein the second heat exchanger side of the heat exchanger is formed at least partially by a cathode feed section of the fuel cell stack.

2. The protective reformer device according to claim 1, wherein the temperature control device is designed as a heating device, as a cooling device or as a combined heating and cooling device.

3. The protective reformer device according to claim 1, wherein the temperature control device is designed at least partially as an independent temperature control device independent of fluid flows of the fuel cell stack.

4. The protective reformer device according to claim 1, wherein the second heat exchanger side of the heat exchanger is formed at least partially by a cathode discharge section of the fuel cell stack.

5. The protective reformer device according to claim 1, wherein the second heat exchanger side of the heat exchanger is formed at least partially by an anode discharge section of the fuel cell stack.

6. The protective reformer device according to claim 1, wherein at least one valve device is provided upstream of the second heat exchanger side of the heat exchanger for a variation of the fluid fed to the second heat exchanger side.

7. The protective reformer device according to claim 1, wherein the gas duct and/or the catalytic converter section are at least partially manufactured using an additive process.

8. A fuel cell system, having
at least one fuel cell stack with an anode section and a cathode section,
a reformer for reforming reformer feed gas,
an anode feed section for feeding reformed anode feed gas from the reformer to the anode section,
a cathode feed section for feeding cathode feed gas to the cathode section,
a reformer feed section for feeding the reformer feed gas to the reformer,
an anode discharge section for discharging anode exhaust gas,
a cathode discharge section for discharging cathode exhaust gas,
wherein a protective reformer device with the features of claim 1 is arranged in the anode feed section between the reformer and the anode section.

9. The fuel cell system according to claim 8, wherein the anode feed section has a main anode feed section (120a) and a bypass anode feed section (120b), wherein the protective reformer device is arranged in the bypass anode feed section (120b).

10. Fuel The fuel cell system according to claim 8, wherein a starting burner device is arranged in the cathode feed section, in the cathode discharge section and/or in the anode discharge section.

11. A method for the protection of an anode section of a fuel cell stack of a fuel cell system with the features of claim 8, having the following steps:
monitoring an anode temperature in the anode section, monitoring a protective reformer temperature of the protective reformer device,
cooling and/or heating the protective reformer device on the basis of the monitored temperatures by means of the temperature control device.

12. The method according to claim 11, wherein the step of cooling and/or heating is carried out on the basis of a specified operating corridor of the protective reformer device.

13. The method according to claim 11, wherein the step of cooling and/or heating is carried out on the basis of a minimum anode temperature and/or of a maximum temperature difference with respect to a cathode temperature of the cathode section of the fuel cell stack.

* * * * *